(12) United States Patent
Mendis et al.

(10) Patent No.: US 6,474,728 B1
(45) Date of Patent: Nov. 5, 2002

(54) ADJUSTABLE PEDALBOX AND FLOOR FOR AN AUTOMOBILE INTERIOR

(75) Inventors: Kolita Mendis, Newbury Park, CA (US); John W. Downs, Simi Valley, CA (US)

(73) Assignee: Ford Global Technologies, Inc., Dearborn, MI (US)

( * ) Notice: Subject to any disclaimer, the term of this patent is extended or adjusted under 35 U.S.C. 154(b) by 35 days.

(21) Appl. No.: 09/690,297

(22) Filed: Oct. 17, 2000

(51) Int. Cl.[7] .................................................. B62D 33/06
(52) U.S. Cl. ................ 296/204; 296/190.08; 296/65.01
(58) Field of Search ................................. 296/204, 185, 296/190.08, 203.02, 65.01, 63, 65.13, 65.15, 65.09

(56) References Cited

U.S. PATENT DOCUMENTS 3,059,960 A * 10/1962 Komorowski et al.
3,774,711 A   11/1973 Lacey
4,392,546 A    7/1983 Crookes et al.
6,086,142 A *  7/2000 Simmons et al. ........ 296/190.1

FOREIGN PATENT DOCUMENTS

DE   44 00 934 C   2/1995
GB   2 288 770 A   11/1995

OTHER PUBLICATIONS

Justerbart pedalstall till personbil, M. Lundberg and A. Persson, University of Linkoping 1999.

* cited by examiner

Primary Examiner—Joseph D. Pape
(74) Attorney, Agent, or Firm—Mark Sparschu

(57) ABSTRACT

An adjustable pedalbox and floor mechanism includes a pedalbox having at least one pedal associated therewith. The pedalbox is in communication with a vehicle seat via an adjustable floor mechanism that extends therebetween. The pedal and seat positions are independently adjustable in the vertical and/or horizontal directions. The floor mechanism is continuous between the pedalbox and the vehicle seat and remains generally horizontal with respect to the ground.

21 Claims, 3 Drawing Sheets

ADJUSTABLE PEDALBOX AND FLOOR FOR AN AUTOMOBILE INTERIOR

TECHNICAL FIELD

The present invention relates to an adjustable seating system for a vehicle, and more particularly, to an adjustable pedalbox and floor mechanism that positions the vehicle pedals, the vehicle seat, and the vehicle floor surface in a way that is comfortable and safe for all drivers.

BACKGROUND ART

Adjustable seating systems for vehicles are well-known in the art. Current adjustable seating systems typically allow a user to electronically adjust a variety of seating characteristics through actuation of one or more switches or buttons. These available adjustments typically include the height of the seat base and the and seat back, the distance of the seat from the foot pedals and the steering wheel, and the angle or cant of the seat base and seat back, as well as other comfort adjustments such as lumbar support.

Conventional adjustable seating systems, however, do not offer optimum ergonomics and vision for all drivers. For example, drivers of short stature are particularly at a disadvantage. While the seat may be positioned to provide optimum vision, pedal reach may still be difficult. By moving the seat closer to the pedals, however, these drivers of relatively short stature are typically located too close to the steering wheel and thus, too close to the airbag. These systems, thus, do not typically allow all users to be both located in the most optimum position from a safety standpoint and in a position with optimum field of view through the front window, to the visual displays or controls, and to the side mirrors.

Mechanisms for adjusting vehicle pedals with respect to the seat to accommodate a variety of users are known. One such mechanism disclosed in a master's thesis report entitled, "Justerbart Pedalställ till personbil," University of Linköping 1999, LITH-IKP-EX-1562, allows the vehicle pedals to be moved or adjusted via their connection to an adjustable floor. This design has been used in some vehicles and many race cars. The structure of these adjustable floors cover the driver foot area and provides support behind the pedals to minimize risk of injury. While the floor can be moved independently of the driver's seat and the steering wheel, it does not correlate movement of the floor with the vehicle seat.

SUMMARY OF THE INVENTION

It is an object of the present invention to provide an adjustable pedalbox and floor mechanism, which maintains a continuous floor surface extending from a foot well area to a vehicle seat.

It is another object of the present invention to provide an adjustable pedalbox and floor mechanism that provides optimum comfort characteristics for a wide range of drivers having varying physical characteristics.

It is still another object of the present invention to provide an adjustable pedalbox and floor mechanism that allows the position of the pedals and seat to be independently adjustable in both the vertical and/or horizontal directions.

It is a further object of the present invention to provide an adjustable pedalbox and floor mechanism that ensures a proper seating position for drivers having a wide range of physical characteristics by maximizing the distance between the driver and the airbag contained in the steering wheel.

It is yet another object of the present invention to provide an adjustable pedalbox and floor mechanism that packages the driving mechanisms to maximize available packaging space and minimize dirt contamination.

In accordance with the above and the other objects of the present invention, a system for adjusting the position of a vehicle occupant to maximize comfort and safety for occupants of varying statures is provided. The system includes a pedal box having at least one pedal mechanism associated therewith. The pedal box is located forwardly of a vehicle seat with respect to a vehicle body structure. The pedal box is in communication with the vehicle seat via an adjustable floor. The adjustable floor has a forward end in communication with the pedal box and a rearward end in communication with the vehicle seat. The adjustable floor provides a continuous surface extending from the pedal box to the vehicle seat in all positions.

These and other features of the present invention will become apparent from the following description of the invention, when viewed in accordance with the accompanying drawings and appended claims.

DESCRIPTION OF THE PREFERRED EMBODIMENT

Figure 1:
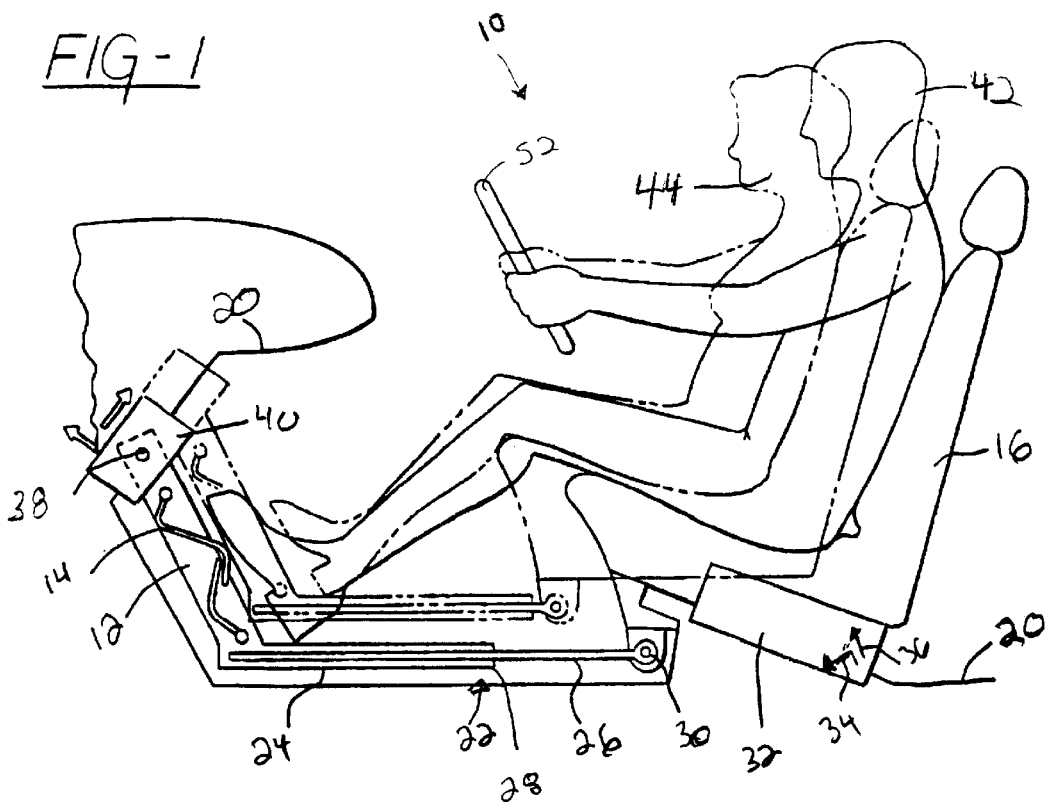
FIG. 1 is a schematic illustration of an adjustable pedalbox and floor mechanism positioned to locate an occupant in accordance with a preferred embodiment of the present invention.
Figure 2:
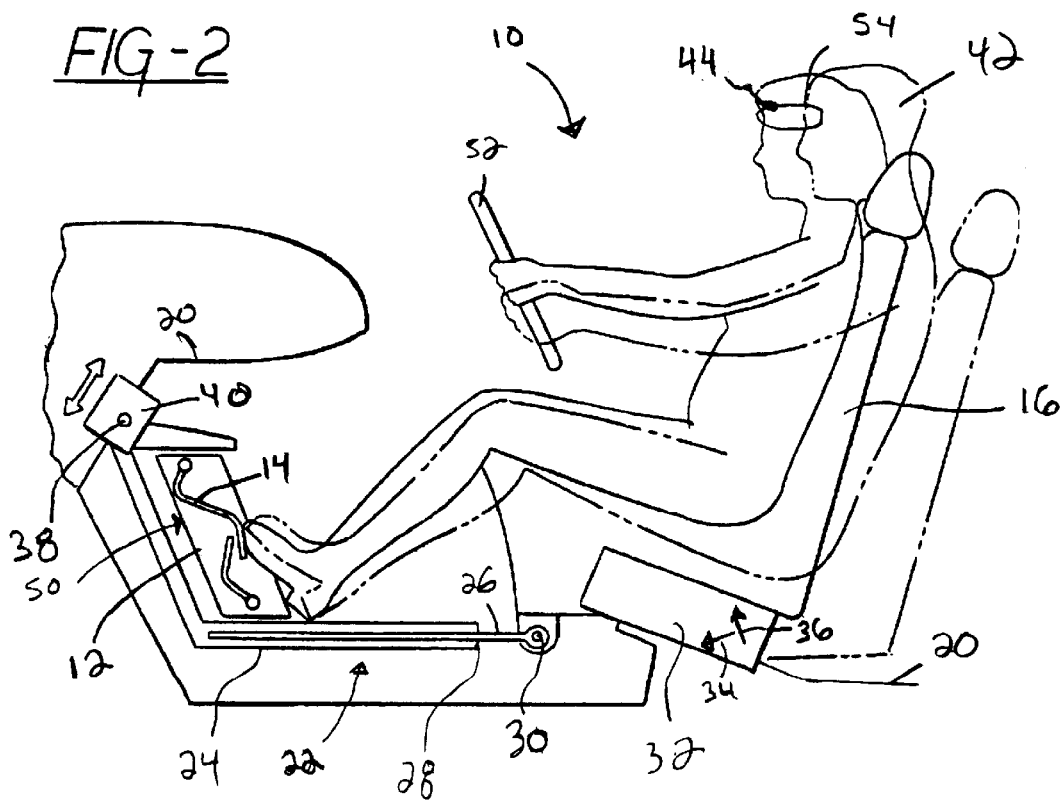
FIG. 2 is a schematic illustration of an adjustable pedalbox and floor mechanism positioned to locate an occupant in accordance with a embodiment of the present invention.

Turning now to FIGS. 1 and 2, which illustrate an adjustable pedal and vehicle seat system to that is intended to be comfortable and safe for all drivers. The adjustable system 10 includes a pedal box 12 with a plurality of pedal mechanisms 14 disposed thereon. The pedal mechanism preferably operates and is configured as described in U.S. patent application Ser. No. 09/455,265, filed Dec. 9, 1999 and entitled, "Method and Apparatus for Vehicular Control Pedals." The system further includes a vehicle seat 16 disposed rearwardly of the pedalbox 12 with respect to a vehicle body structure 20. The pedalbox 12 is connected to the vehicle seat 16 by a floor mechanism 22, which is maintained in a generally parallel relationship with respect to the ground.

The floor mechanism 22 includes a forward section 24 and a rearward section 26 which are preferably connected by a translational joint 28 such that a telescoping relationship exists between the forward and rearward sections 24, 26. As shown, the rearward section 26 is preferably telescopically received within the forward section 24. Alternatively, the forward section 24 may be telescopically received within the rearward section 26. It should be understood that other configurations may be utilized that let the sections move and adjust their relative length with respect to one another. The rearward section 26 of the floor mechanism 22 is attached to the vehicle seat 16 via a revolute joint 30. The vehicle seat 16 is attached to the vehicle body structure 20 by an appropriate connecting mechanism 32 that allows translational motion in the fore-aft direction and/or the vertical direction, as generally indicated by the arrows 34, 36 respectively.

The forward section 24 of the floor mechanism 22 is preferably rigidly connected to the pedalbox 12. The pedalbox 12 in turn is supported by a revolute joint 38. The revolute joint 38 is attached to a moveable carriage 40 that allows transitional motion of the pedalbox 12 with respect to the vehicle body structure 20. The pedal and vehicle seat system 10 provides improved ergonomic seating for drivers of both large and small stature, as generally represented by references numbers 42 and 44.

FIG. 1 illustrates the pedal and vehicle seat system 10 with the components located in a first position to accommodate the larger driver 42. Conversely, FIG. 1 also illustrates the pedal and vehicle seat system 10 with the components located in a second position to accommodate the smaller driver 44. Obviously, the components can be located in a variety of other positions to accommodate a variety of drivers with varying statures ranged between the larger driver 42 and the smaller driver 44.

In operation, the vehicle seat 16 is positioned in the fore-aft direction and/or the vertical direction by adjusting the seat support mechanism 32, in order to suit the seating requirements of the driver. The seat support mechanism 32 may be adjusted manually or automatically, such as by depression of a button. The pedalbox 12 is then positioned by adjusting the position of the moveable carriage 40 in order to suit the driver's stature. The forward and rearward sections 24, 26 of the floor mechanism 22 are free to slide with respect to each other in order to accommodate the independent positions of the moveable carriage 40 and the seat support mechanism 32. The seat support mechanism 32 and the moveable carriage 40 may each be reduced to a single degree of freedom and/or coordinated to move together by a mechanical or electronic mechanism so as to provide a single control for the driver. Prior to adjustment of the vehicle seat 16 and the pedalbox 12, the floor mechanism 22 is positioned generally parallel to a ground surface and after the adjustment the floor mechanism 22 is also disposed generally parallel to the ground surface.

The angle of orientation of the connecting mechanism 32 and the moveable carriage 40 can vary to be configured to slide in either a horizontal or a vertical direction, or both depending upon the packaging requirements of the vehicle. FIG. 1 illustrates the moveable carriage 40 oriented to travel in both a vertical and a horizontal direction with respect to the vehicle body structure 20. FIG. 2 illustrates the moveable carriage 40 oriented to travel in a vertical direction with respect to the vehicle body structure 20. The forward and rearward sections 24, 26 of the telescoping floor mechanism 22 follow the movement of the moveable carriage 40 and the seat support mechanism 32 and preferably remain horizontal throughout the adjustment process through synchronization of the sliding mechanism 32, 40. Alternatively, the adjustment process could be non-synchronized such that the floor mechanism is non-parallel to the ground during the adjustment process so long as the floor mechanism 22 returns to a parallel position upon completion of the process. As shown in FIG. 2, the pedalbox 12 to which the pedals 14 are attached can alternatively be additionally moveable with respect to the forward section 24 of the telescoping floor mechanism 22 via an appropriate mechanism 50.

In accordance with a preferred embodiment, an average sized occupant can be located such that the range of motions of the sliding mechanisms are situated in the middle of the available translational range. The largest and smallest occupant sizes 42, 44 respectively can be accommodated at the extremes of travel of the sliding mechanisms. The positional flexibility of the adjustable pedal and vehicle seat system 10 reduces the range of adjustability necessary to properly position the steering wheel 52 and thereby reduce the size of the eye-ellipse 54 of the seat system 10.

Figure 3A:
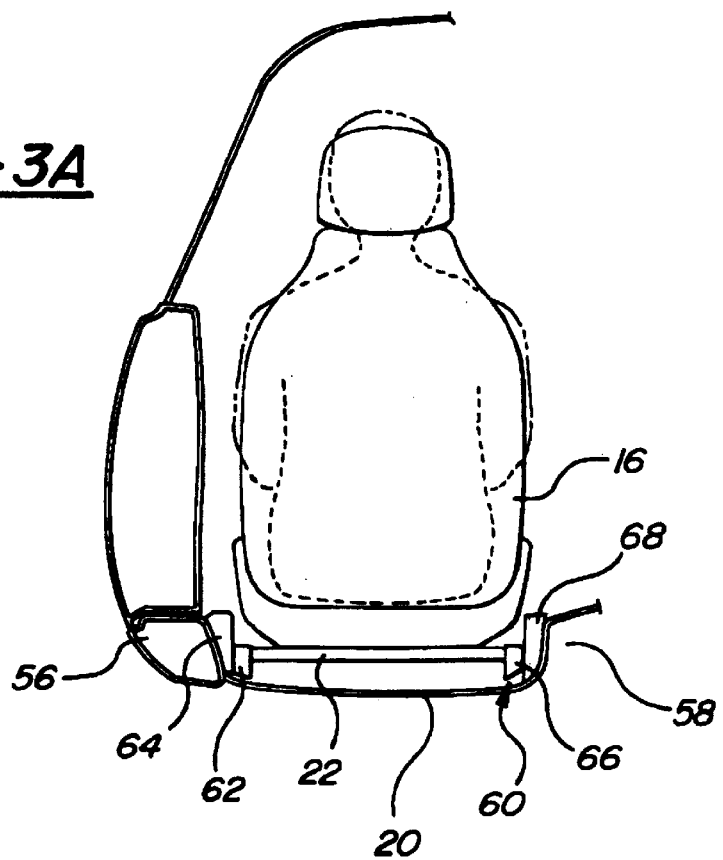
FIG. 3A is a rear view of an occupant compartment with an adjustable pedalbox and floor mechanism in a first position in accordance with a preferred embodiment of the present invention.
Figure 3B:
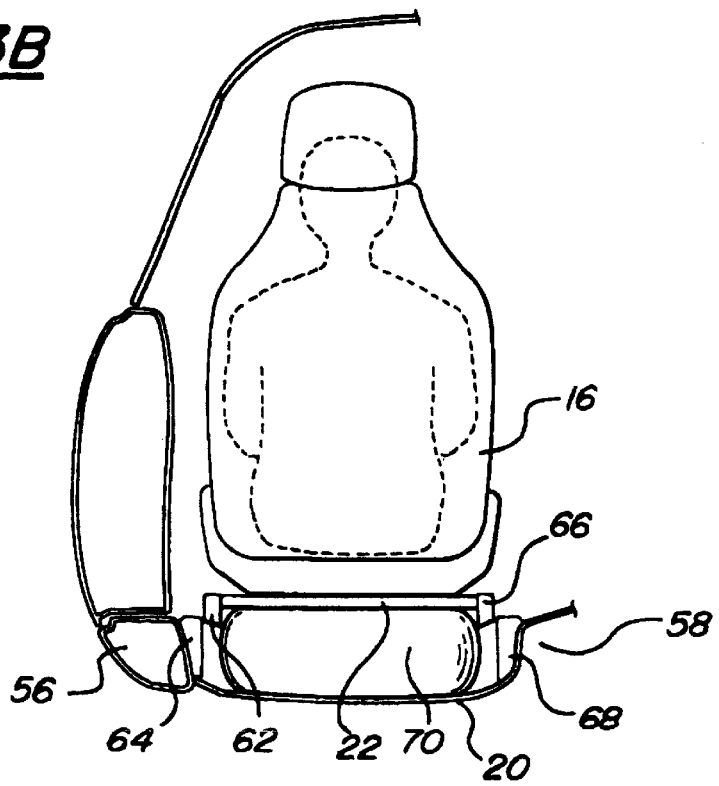
FIG. 3B is a rear view of a passenger compartment with an adjustable pedalbox and floor mechanism in a second position in accordance with a preferred embodiment of the present invention.
Figure 3C:
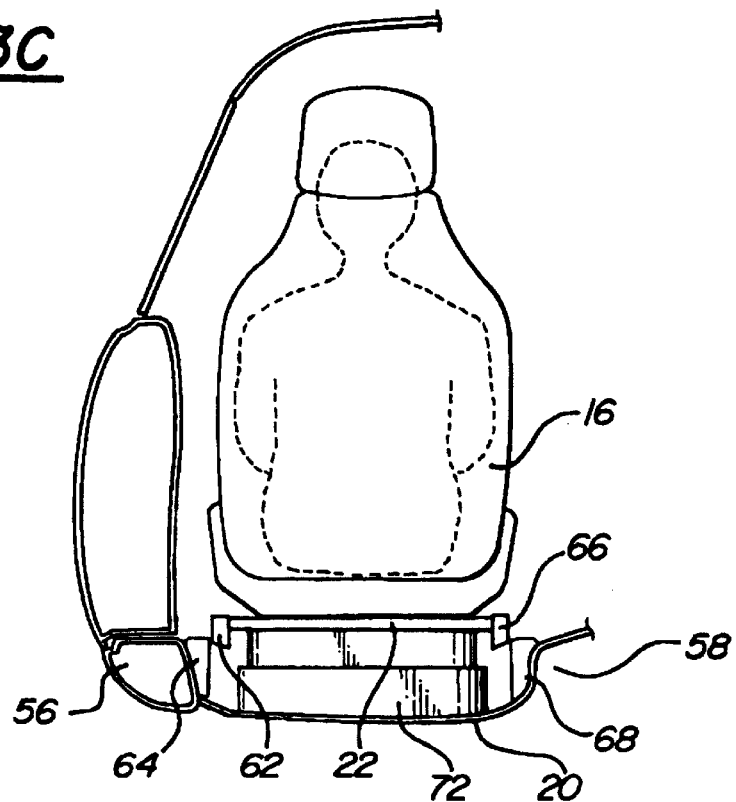
FIG. 3C is a rear view of a passenger compartment with an adjustable pedalbox and floor mechanism in a second position in accordance with another embodiment of the present invention.
Figure 3D:
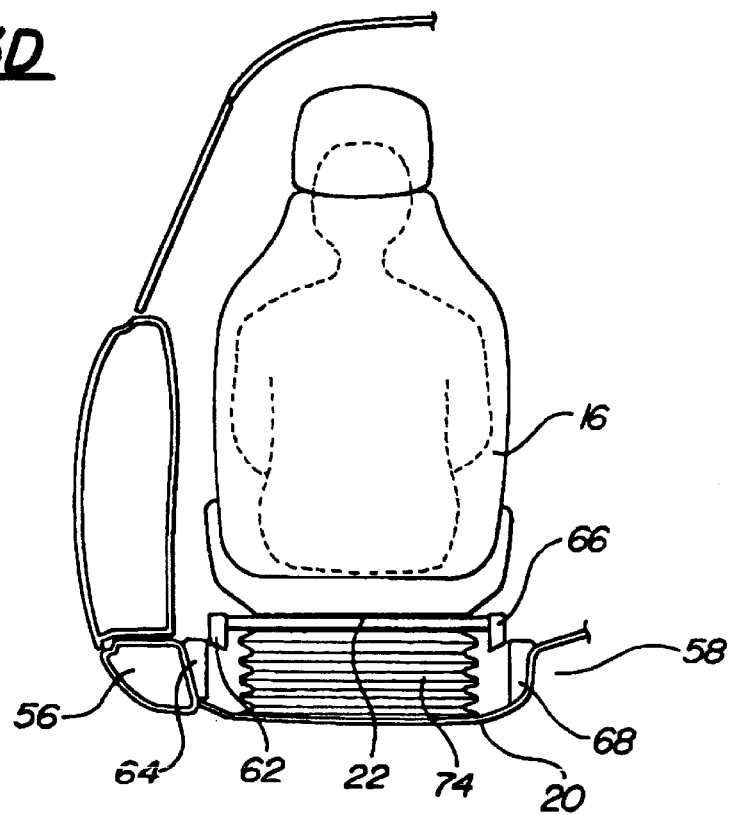
FIG. 3D is a rear view of a passenger compartment with an adjustable pedalbox and floor mechanism in a second position in accordance with another embodiment of the present invention.

As shown in FIGS. 3A and 3B, as the floor mechanism 22 moves upward, it may rise above vehicle body structural surfaces on either side, such as a sill 56 and a tunnel 58. When the floor mechanism 22 is raised, as shown in FIG. 3B, a gap can be exposed between the raised floor mechanism 22 and the sill 56 or the tunnel 58. The system 10 eliminates the gap through the provision of a suitable blocking device 60. The device 60 includes a first partition 62 located on the floor mechanism 22 and a second partition 64 located on the sill 56. Similarly, the device 60 includes a first partition 66 located on the floor mechanism 22 and a second partition 68 located on the tunnel 58. The partitions 62, 64, 66, 68 are positioned on either side of the floor mechanism 22 so that no gap appears between the floor mechanism 22 and the sill 56 or tunnel 58 in the extreme vertical position of the floor 22. The blocking device 60 could alternatively be a mechanical shutter 72 (FIG. 3C), an inflatable bladder 70 (FIG. 3B) or an accordion fold 74 (FIG. 3D) to fill the gap between the floor mechanism 22 and the sill 56 or tunnel 58 when the floor mechanism 22 is in a raised position.

The floor mechanism 22 thus provides a continuous surface between the pedalbox 12 and the vehicle seat 16. Additionally, in the preferred embodiment, the seat support mechanism 32 and the moveable carriage 40 can be configured to maximize packaging space and minimize contamination thereof due to dirt. The system 10 thus provides optimum comfort and visibility characteristics for a wide range of drivers with varying physical characteristics. The system 10 also ensures that the driver is located a safe distance from the airbag in the steering wheel 52.

Having now fully described the invention, it will be apparent to one of ordinary skill in the art that many changes and modifications can be made thereto without departing from the spirit or scope of the invention as set forth herein.

What is claimed is:

1. A system for locating an occupant in a position to maximize comfort and safety for drivers of varying statures, comprising;
   a pedalbox having at least one pedal mechanism associated therewith;
   a vehicle seat disposed rearwardly of said pedalbox;
   an adjustable floor located between and in communication with said pedalbox at a forward end and said vehicle seat at a rearward end;
   whereby said adjustable floor provides a continuous surface extending from said pedalbox to said vehicle seat in all positions; and
   wherein said adjustable floor is length-adjustable.

2. The system of claim 1, further comprising:
   a moveable carriage that is coupled to said pedalbox to allow translational movement thereof.

3. The system of claim 1, wherein said adjustable floor remains generally parallel to a ground surface at all times.

4. A system for locating an occupant in a position to maximize comfort and safety for drivers of varying statures, comprising:
   a pedalbox having at least one pedal mechanism associated therewith;
   a vehicle seat disposed rearwardly of said pedalbox;
   an adjustable floor located between and in communication with said pedalbox at a forward end and said vehicle seat at a rearward end;
   whereby said adjustable floor provides a continuous surface extending from said pedalbox to said vehicle seat in all positions; and
   wherein said adjustable floor comprises a forward section and a rearward section that have a telescoping relationship to accommodate adjustment of said adjustable floor.

5. A system for locating an occupant in a position to maximize comfort and safety for drivers of varying statures, comprising:
   a pedalbox having at least one pedal mechanism associated therewith;
   a vehicle seat disposed rearwardly of said pedalbox;
   an adjustable floor located between and in communication with said pedalbox at a forward end and said vehicle seat at a rearward end; and
   a blocking device that eliminates any gap between said adjustable floor and any vehicle body structure when said adjustable floor is in a fully raised position;
   whereby said adjustable floor provides a continuous surface extending from said pedalbox to said vehicle seat in all positions.

6. The system of claim 5, wherein said blocking device further comprises:
   a pair of partitions located on either side of said adjustable floor.

7. The system of claim 5, wherein said blocking device is a mechanical shutter.

8. The system of claim 5, wherein said blocking device is an inflatable bladder.

9. A method of locating an occupant in an optimum position in a driver's compartment of a vehicle, comprising:
   positioning a pedalbox to suit the stature of the occupant;
   positioning a vehicle seat to suit the seating requirements of the occupant;
   moving an adjustable floor as said pedalbox and said vehicle seat are being positioned such that said adjustable floor remains in a generally horizontal position with respect to a ground surface; and
   wherein said step of moving an adjustable floor further comprises length-adjusting said adjustable floor.

10. The method of claim 9, wherein said step of positioning said vehicle seat is accomplished by adjusting a slideable seat support mechanism.

11. The method of claim 9, wherein said step of positioning said pedalbox is accomplished by adjusting a slideable pedalbox carriage.

12. The method of claim 9, wherein said vehicle seat and said pedalbox are independently adjustable.

13. The method of claim 9, wherein said vehicle seat and said pedalbox are jointly adjusted.

14. An adjustable pedalbox and floor system for a vehicle comprising:
   a pedalbox having at least one pedal disposed thereon, said pedalbox having a range of motion between a first position and a second position;
   a seat being disposed rearwardly of said pedalbox, said seat having a range of motion between a first position and a second position;
   a floor mechanism extending from said pedalbox to said seat to provide a continuous floor therebetween, said floor mechanism being adjustable between a first length and a second length.

15. The system of claim 14, wherein said floor mechanism includes a forward portion that is operatively connected to said pedalbox and a rearward portion that is operatively connected to said seat.

16. The system of claim 15, wherein said forward portion and said rearward portion are telescoping with respect to one another to adjust said length of said floor mechanism.

17. The system of claim 14, wherein said seat is moved between said first position and said second position by a sliding seat support mechanism.

18. The system of claim 17, wherein said pedalbox is moved between said first position and said second position by a sliding carriage.

19. The system of claim 14, further comprising:
   a blocking device that eliminates any gap between said floor mechanism and a vehicle body structure when said floor mechanism is moved upward with respect to a ground surface.

20. The system of claim 19, wherein said blocking device further comprises:
   a pair of partitions located on either side of said floor mechanism.

21. The system of claim 19, wherein said blocking device is selected from one of the following:
   a mechanical shutter, an inflatable bladder, or an accordion fold.

* * * * *